UNITED STATES PATENT OFFICE.

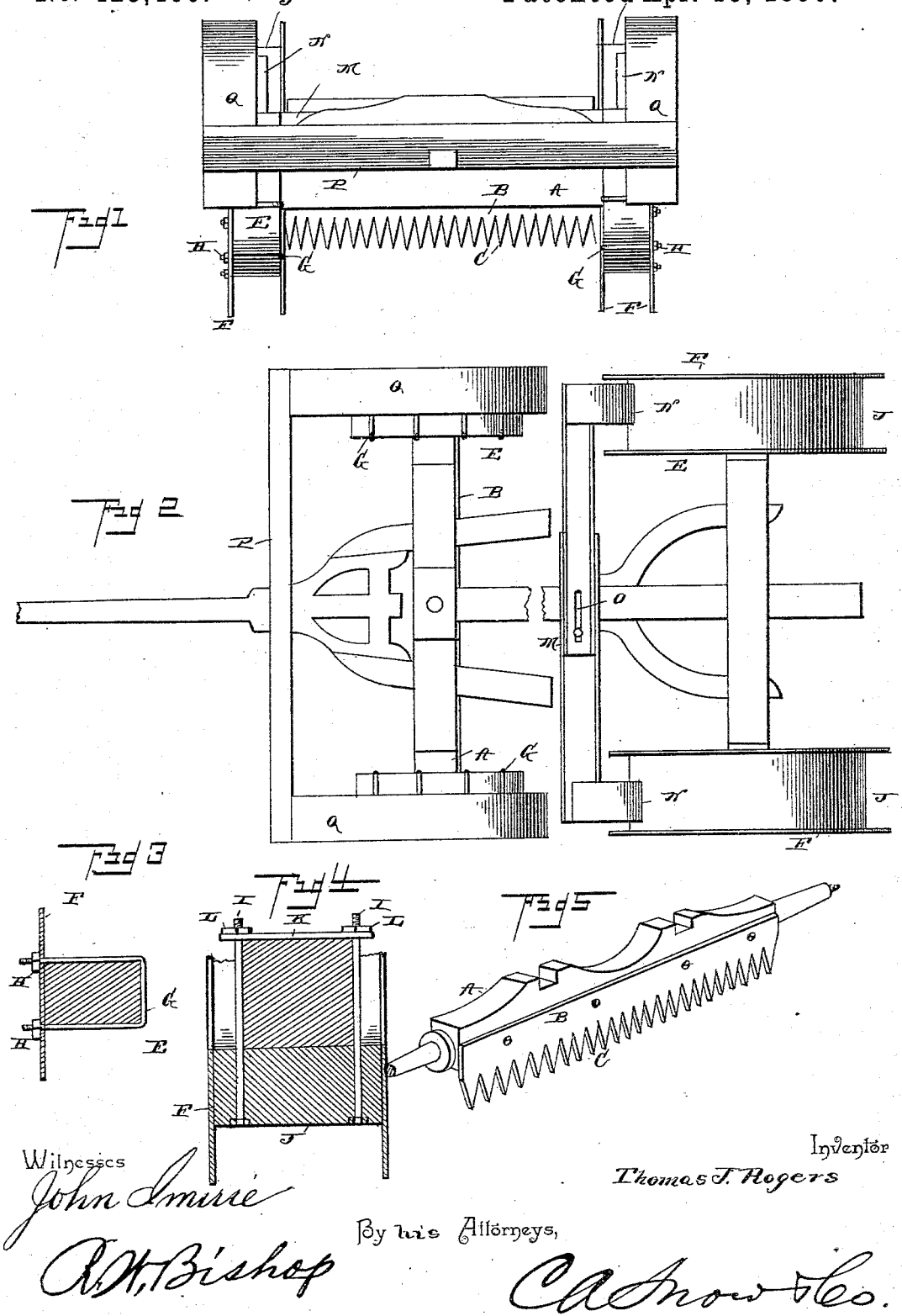

THOMAS J. ROGERS, OF SEARCY, ARKANSAS.

SUBSOILER AND BUSH-PULLER.

SPECIFICATION forming part of Letters Patent No. 425,460, dated April 15, 1890.

Application filed July 16, 1889. Serial No. 317,749. (No model.)

*To all whom it may concern:*

Be it known that I, THOMAS J. ROGERS, a citizen of the United States, residing at Searcy, in the county of White and State of Arkansas, have invented a new and useful Subsoiler and Grub-Puller, of which the following is a specification.

My invention relates to improvements in subsoilers and grub-pullers; and it consists in certain novel features hereinafter described and claimed.

In the accompanying drawings, Figure 1 is a front elevation of my improved machine. Fig. 2 is a top plan view of the same. Figs. 3 and 4 are detail views showing the manner of securing the blades to the wheel. Fig. 5 is a detail view of the grub-puller.

To the front axle A of an ordinary running-gear I secure the transverse strip B, provided on its lower edge with the series of teeth C, which are adapted to take into the bushes and grubs as the device is drawn over the field and pull the same from the ground.

To the wheels E of the vehicle I secure the subsoiling-blades F, a pair of blades being secured to each of the rear wheels, while a single blade is secured to each front wheel, all of said blades being made in sections for convenience in repairing and storing. The front blades are secured to the wheels by means of the U-shaped bolts G, passing around the fellies of the wheels and through the blades, and the securing-nuts H mounted on the ends of said bolts and turning up against the blades. The rear blades are secured to the wheel by means of the securing-bolts I, which are inserted through the circular band or rim J connecting these blades, and pass on opposite sides of the fellies through the ends of the clip-plates K, which bear against the inner side of the fellies and the nuts L, which are mounted on the ends of said bolts and turn up against said clip-plates.

To the reach of the running-gear I secure the laterally-projecting arms M, provided with scrapers N at their ends, which bear on the bands J and remove therefrom any dirt that may cling thereto. These arms M are secured by means of a suitable bolt passing through longitudinal slots O in their inner ends, so that they may be adjusted according to the width of the vehicle. To the tongue I secure a cross-bar P, and to the ends of this cross-bar I secure the hoods or shields Q, which extend rearward over the front blades F and prevent the same cutting the team.

The construction and arrangement of the several parts of my device being thus made known, the operation and advantages of the same will, it is thought, be readily understood.

The machine is drawn along the ground in the usual manner and the grub-puller B catches into the grubs and small bushes, so as to pull the same from the ground and drag them to one end of the field, thereby effectually cleaning the field. The blades secured to the wheels cut into the earth, so as to prepare the same for cultivation and lessen the labor of subsequently breaking the ground prior to planting.

My device is very simple in its construction and can be applied to any ordinary running-gear at a slight cost. The blades are securely fastened to the wheels, and at the same time they can be easily removed, when so desired, for the purpose of repairing any part or when it is desired to use the vehicle for ordinary purposes.

Having thus described my invention, what I claim, and desire to secure by Letters Patent, is—

1. The combination of the blades secured to the fellies of the front wheels, and the hoods or shields supported by the tongue and passing rearward over the blades, as set forth.

2. The combination of the band adapted to be clamped to the rear wheels and carrying blades, and the transversely-adjustable supporting-arms having scrapers at their ends bearing on said bands, as set forth.

3. The combination of the wheels, the bands fitting around the same, the blades secured to said bands, the clip-plates bearing against the inner side of the felly, and bolts passed through the band and the clip-plate and provided with securing-nuts turning up against said plates, as set forth.

4. The improved subsoiler and bush-puller, consisting of a running-gear, a metallic strip secured to the front axle of said gear and having a series of depending teeth along its lower edge, cutting-bands removably secured to the wheels of the gear, the hood supported by the tongue of the gear and projecting rearward over the bands on the front wheels, and the transversely-adjustable scrapers mounted on the gear and bearing on the rear wheels, as specified.

In testimony that I claim the foregoing as my own I have hereto affixed my signature in presence of two witnesses.

THOMAS J. ROGERS.

Witnesses:
J. G. WALKER,
J. J. BELL.